United States Patent [19]
Mori

[11] Patent Number: 4,471,412
[45] Date of Patent: Sep. 11, 1984

[54] ILLUMINATION DEVICE

[76] Inventor: Kei Mori, 3-16-3-501, Kaminoge, Setagaya-ku, Tokyo, Japan

[21] Appl. No.: 454,897

[22] Filed: Dec. 30, 1982

[30] Foreign Application Priority Data

Jan. 9, 1982 [JP] Japan .................................. 57-2157

[51] Int. Cl.³ ............................................ F21V 7/04
[52] U.S. Cl. ...................................... 362/32; 362/31;
362/278; 362/307; 362/308; 362/310; 362/311;
362/320; 362/328; 362/329
[58] Field of Search ............. 362/249, 252, 318, 320,
362/31, 32, 278, 307, 308, 310, 311, 328, 329

[56] References Cited

U.S. PATENT DOCUMENTS

| | | | |
|---|---|---|---|
| 2,713,629 | 7/1955 | Etzkorn | 362/278 |
| 3,641,333 | 2/1972 | Gendron | 362/250 |
| 3,714,414 | 1/1973 | Sternius | 362/249 |
| 3,755,663 | 8/1973 | George, Jr. | 362/249 |
| 4,107,767 | 8/1978 | Anquetin | 362/249 |
| 4,177,503 | 12/1979 | Anquetin | 362/249 |
| 4,249,231 | 2/1981 | Decaux | 362/31 |
| 4,263,640 | 4/1981 | Altman | 362/252 |
| 4,271,458 | 6/1981 | George, Jr. | 362/249 |
| 4,376,966 | 3/1983 | Tieszen | 362/293 |

Primary Examiner—Stephen J. Lechert, Jr.
Attorney, Agent, or Firm—Jordan and Hamburg

[57] ABSTRACT

An illumination element having a transparent flexible tube and a fine flexible light conducting member accommodated in the tube. The light conducting member is provided with a number of light outlet sections at spaced locations along its length. Light is incident on at least one end of the light conducting member and caused to break through the light outlet sections while propagating through the light conducting member. The light is available for ornamental lighting or the like.

9 Claims, 7 Drawing Figures

ILLUMINATION DEVICE

BACKGROUND OF THE INVENTION

The present invention relates to an illumination device and, more particularly, to an illumination element for use in such a device which employs a member capable of transmitting either natural light or artificial light therethrough.

I have proposed a light transmission system in which sunlight is converged by a lens or the like to become incident on a light conducting member and then transmitted through the light conducting member to a desired location where it may be utilized for illumination or any other purpose. This will contribute a great deal to the cutdown in cost when applied to the interiors of buildings as well as others for ornamental lighting, for example. In this connection, there is a demand for an illuminator which can effectively diffuse the converged light to the environment and be provided with any desired shape which suits a specific application.

SUMMARY OF THE INVENTION

An illumination element embodying the present invention includes at least one light conducting member for conducting light therethrough which is incident on at least one end thereof with an external light source. Light outlet means causes the light to stream to the outside of the light conducting member at a plurality of spaced locations along the length of the light conducting member.

In accordance with the present invention, an illumination element has a transparent flexible tube and a fine flexible light conducting member accommodated in the tube. The light conducting member is provided with a number of light outlet sections at spaced locations along its length. Light is incident on at least one end of the light conducting member and caused to break through the outlet sections while propagating through the light conducting member. The light is available for ornamental lighting or the like.

It is an object of the present invention to provide an illuminator which desirably diffuses converged sunlight for ornamental lighting or like purpose.

It is another object of the present invention to provide an illuminator which can readily be provided with any unique shape.

It is another object of the present invention to provide a generally improved illuminator.

Other objects, together with the foregoing, are attained in the embodiments described in the following description and illustrated in the accompanying drawings.

DESCRIPTION OF THE PREFERRED EMBODIMENTS

While the illumination element of the present invention is susceptible of numerous physical embodiments, depending upon the environment and requirements of use, substantial numbers of the herein shown and described embodiments have been made, tested and used, and all have performed in an eminently satisfactory manner.

Figure 1:
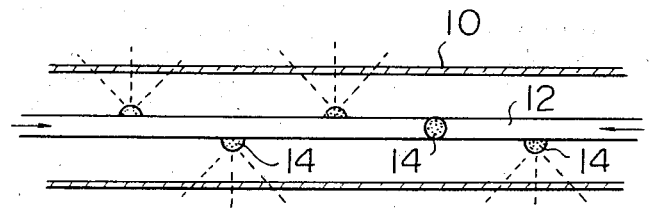
FIG. 1 is a fragmentary view of an illumination element embodying the present invention.

Referring to FIG. 1 of the drawings, the illumination element comprises a flexible transparent tube or tubular sheath 10 and a light conducting member 12 which extends throughout the transparent tube 10. A number of light outlet sections 14 are arranged on the light conductor 12 at spaced locations along the length of the latter. Sunlight is converged by a lens or like converging means (not shown) and introduced into the light conductor 12 from one or both ends as indicated by arrows in the drawing. While propagating through the light conductor 12, the converged light comes out through the light outlet sections 14 so as to illuminate the adjacent space. The light conductor 12 is shaped very small in diameter and has flexibility. Hence, whatever the shape of the flexible tube 10 may be, the light conductor 12 can be passed through the tube 10 smoothly following any curve or bend of the tube 10. This permits the tube 10 to be shaped as desired to match it with the configuration of a desired illuminator.

Figure 2:
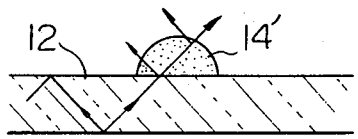
FIGS. 2-4 are sections of different examples of a light outlet section included in the illumination element shown in FIG. 1.

Referring to FIG. 2, an example of the light outlet sections 14 is shown in detail. In this embodiment, the light conductor 12 is in the form of an optical rod or fiber which may be made of quartz or plastics, for example. The optical rod or fiber carries thereon a light diffusing member 14' which is spaced a desired distance from adjacent ones as previously mentioned. The light diffusing member 14' is formed of a material whose refractive index is larger than that of the optical rod or fiber 12. The converged light propagating through the light conductor 12 is emitted to the outside through the light diffusers 14'.

Figure 3:
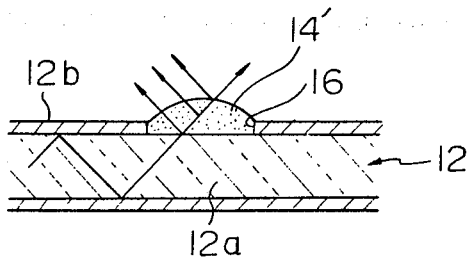

Referring to FIG. 3, another example of the light outlet section 14 is shown in detail. The light conductor 12 in this embodiment comprises an optical fiber made up of a core 12a and a clad layer 12b. The clad layer 12b is cut out as indicated by the reference numeral 16 at spaced locations which correspond to the light outlet sections 14. The light diffusing material 14' is deposited on the core 12a within each of the spaced apertures 16. The refractive index of the light diffusers 14' is larger than that of the core 12a of the optical fiber 12. The light diffusers 14' thus serve to give exit to the stream of light transmitted through the core 12a out to the intended environment.

Figure 4:
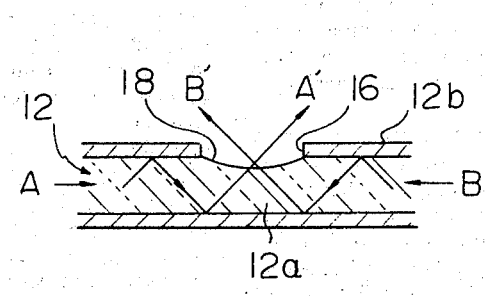

Referring to FIG. 4, sill another example of the light outlet section 14 is illustrated. As shown, the light conductor 12 comprises an optical fiber having a core 12a and a clad layer 12b, as in the structure shown in FIG. 3. Again, the clad layer 12b is shaped to define apertures 16 to expose the core 12a therethrough to the outside. A characteristic feature of this embodiment resides in that the part of the core 12a so exposed to the outside is notched to form a generally concave surface 18. The light transmitted through the core 12a breaks to the environment through the spaced concave surfaces 18 and apertures 15, i.e. light outlet sections 14. Due to the inherent structure shown, the light propagating through the core 12a of the optical fiber in a direction A is allowed to leave it only in a direction A'. It is therefore preferable to introduce the light not only in the direction A but in the other direction B as illustrated, so that the light advancing in the direction B will be emitted in a direction B'.

Figure 5:
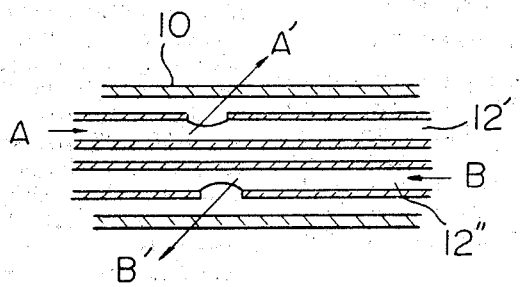
FIG. 5 is a fragmentary section of another embodiment of the present invention.

Referring to FIG. 5, another embodiment of the present invention is shown which is designed to pass the light in one direction through one optical fiber and in the other direction through another optical fiber. Thus, the illumination element shown in FIG. 5 has at least two optical fibers 12' and 12" which are arranged in parallel within the flexible tube 10. Each of the optical fibers 12' and 12" is formed with the light outlet sections shown in FIG. 4 at spaced locations therealong, although details thereof will not be described for simplicity. Light is transmitted through the optical fiber 12' in a direction A and through the other optical fiber 12" in the opposite direction B, so that it streams out to the neighborhood in both directions A' and B' as a whole.

Figure 6:
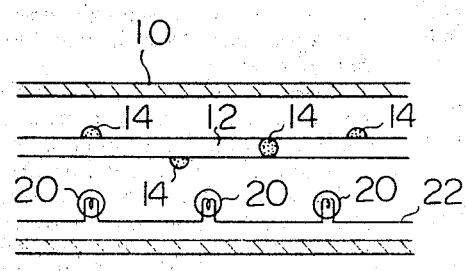
FIG. 6 is a view similar to FIG. 5 but showing still another embodiment of the present invention.

Referring to FIG. 6, there is shown a further embodiment of the present invention which uses artificial light in combination with sunlight. The illumination element has a flexible tube 10 and a light conducting member 12 which are substantially common to those shown in FIG. 1. The light conductor 12 carries thereon a number of light outlet sections 14 in the previously described fashion. The light transmitted through the light conductor 12 is aided by artificial light which is emitted from a train of miniature bulbs 20. As shown, the miniature bulbs 20 are interconnected in parallel or in series by a lead 22. The combined arrangement of the light conductor 12 and miniature bulbs 20 within the common tube 10 is advantageous in that the miniature bulbs 20 may be turned on for illumination when sunlight is unavailable.

Figure 7:
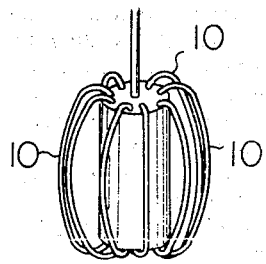
FIG. 7 is a perspective view of an exemplary illuminator using the illumination element of the present invention.

An example of illuminators using the illumination element of the present invention is illustrated in FIG. 7. The illuminator includes a number of flexible transparent tubes 10 each accommodating the light conductor with or without the miniature bulbs thereinside. The tubes 10 are respectively bent to present a desired profile in combination. Naturally, various other unique shapes of illuminators are achievable by suitably shaping and arranging the tubes 10.

In any one of the foregoing embodiments, the flexible tube 10 may typically be made of acrylic resin, plastics or glass.

In summary, it will be seen that the present invention provides an illumination element which effectively illuminates the environment for ornamental lighting or like purpose. Because the illumination element is flexible to any desired shape, an illuminator of a desired configuration can readily be attained. Additionally, an outer sheath or tube of the element not only protects and supports its associated light conductor or the like but can be cleaned itself quite easily.

Various modifications will become possible for those skilled in the art after receiving the teachings of the present disclosure without departing from the scope thereof. For example, a mirror may be located at the tail end of each light conducting member opposite to the light input end. Then, the light transmitted through the light conductor as far as the tail end will be reflected by the mirror to propagate back toward the input end while streaming through the light outlet sections as described. This promotes more effective use of the light introduced into the light conductor. Meanwhile, because the light conveyed by the light conductor is emitted through the successive light outlet sections, its intensity becomes progressively lowered as it approaches the tail end of the light conductor. To compensate for the uneven illumination intensity distribution, various implements are available such as reducing the distance between the adjacent light outlet sections, increasing the effective area of the light outlet sections, or reducing the thickness of the light diffusers in the light outlet sections, each along the direction of light propagation.

What is claimed is:

1. An illumination element comprising:
   at least one light conducting member for conducting light therethrough which is incident on at least one end thereof with an external light source;
   a tubular transparent sheath for accommodating said light conducting member thereinside; and
   light outlet means for causing the light to stream to the outside of the light conducting member at a plurality of spaced locations along the length of the light conducting member, said light outlet means comprising light diffusing members securely carried on the outer periphery of the light conducting member.

2. An illumination element comprising:
   at least one light conducting member for conducting light therethrough which is incident on at least one end thereof with an external light source, said light conducting member comprising an optical fiber having a core and a clad layer;
   a tubular transparent sheath for accommodating said light conducting member thereinside; and
   light outlet means for causing the light to stream to the outside of the light conducting member at a plurality of spaced locations along the length of the light conducting member, said light outlet means comprising cut-out portions of the clad layer and light diffusing members securely carried on the core at the respective cut-out portions.

3. An illumination element comprising:
   at least one light conducting member for conducting light therethrough which is incident on at least one end thereof with an external light source, said light conducting member comprising an optical fiber having a core and a clad layer;
   a tubular transparent sheath for accommodating said light conducting member thereinside; and
   light outlet means for causing the light to stream to the outside of the light conducting member at a plurality of spaced locations along the length of the light conducting member, said light outlet means comprising cut-out portions of the clad layer and notches formed in the core in register with said cutout portions of the clad layer.

4. An illumination element as claimed in claim 3 in which a plurality of the light conducting members extend in parallel through the sheath, one of said light conducting members being supplied with light at one end thereof and the other at one end thereof which is opposite to said one end of said one light conducting member.

5. An illumination element comprising:
   at least one light conducting member for conducting light therethrough which is incident on at least one end thereof with an external light source;
   a tubular transparent sheath for accommodating said light conducting member thereinside; and
   light outlet means for causing the light to stream to the outside of the light conducting member at a plurality of spaced locations along the length of the light conducting member, the spacing between the light outlet means being progressively decreased along the direction of light conduction.

6. An illumination element comprising:
at least one light conducting member for conducting light therethrough which is incident on at least one end thereof with an external light source;
a tubular transparent sheath for accommodating said light conducting member thereinside; and
light outlet means for causing the light to stream to the outside of the light conducting member at a plurality of spaced locations along the length of the light conducting member, the effective area of the light outlet means being progressively increased along the direction of light conduction.

7. An illumination element comprising:
at least one light conducting member for conducting light therethrough which is incident on at least one end thereof with an external light source;
a tubular transparent sheath for accommodating said light conducting member thereinside; and
light outlet means for causing the light to stream to the outside of the light conducting member at a plurality of spaced locations along the length of the light conducting member, the thickness of the light outlet means being progressively decreased along the direction of light conduction.

8. An illumination element comprising:
at least one light conducting member for conducting light therethrough which is incident on at least one end thereof with an external light source;
a mirror for reflecting light which is located at the other end of the light conducting member;
a tubular transparent sheath for accommodating said light conducting member thereinside; and
light outlet means for causing the light to stream to the outside of the light conducting member at a plurality of spaced locations along the length of the light conducting member.

9. An illumination element comprising:
at least one light conducting member for conducting light therethrough which is incident on at least one end thereof with the sun as an external light source;
a tubular transparent sheath for accommodating said light conducting member thereinside; and
light outlet means for causing the light to stream to the outside of the light conducting member at a plurality of spaced locations along the length of the light conducting member.

* * * * *